350-396 SR
XR 3,451,815
CROSS REFERENCE SEARCH ROOM
1X4046E X4048D

3,451,815
NOVEL PHOTOGRAPHIC PRODUCT AND PROCESS

Meroe M. Morse, Boston, Mass., assignor to Polaroid Corporation, Cambridge, Mass., a corporation of Delaware No Drawing. Filed July 25, 1963, Ser. No. 297,657
Int. Cl. G03c 5/54, 9/08
U.S. Cl. 96—29 3 Claims

ABSTRACT OF THE DISCLOSURE

Procedure for preparing light-polarizing images by developing an exposed photosensitive element with an aqueous alkaline processing composition, exhausting alkali in exposed areas, and transferring unexhausted alkali to a superposed light-polarizing sheet material reactive with the alkali, whereby to produce an imagewise altering of the light-polarizing properties of the sheet material.

This invention relates to photography and more particularly to novel light-polarizing images and the preparation thereof.

A primary object of the invention therefore is to provide a novel system for preparing light-polarizing images.

Another object is to provide a one-step system for preparing negative transparencies which in turn are useful in preparing three-dimensional or stereoscopic images.

Yet another object is to prepare a light-polarizing image by effecting an imagewise removal or destruction of the polarizing properties of a light-polarizing material.

Still another object of the invention is to provide a novel system for preparing light-polarizing images wherein an exposed photosensitive element is developed and, as a function of development, an imagewise distribution of ingredients are formed which are capable of altering the polarizing properties of a light-polarizing material to form a polarizing image thereon.

Other objects of the invention will in part be obvious and will in part appear hereinafter.

The invention accordingly comprises the process involving the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description.

Copending application Ser. No. 297,658, filed concurrently herewith, in the name of Edwin H. Land, describes and claims processes for forming visible images by developing an exposed photosensitive element and, as a function of development, forming an imagewise distribution of constituents which are capable of altering the optical density, e.g., the light-absorption or light-reflection characteristics of a superposed sheet material, and transferring at least a portion of this imagewise distribution, by imbibition, to the sheet material to produce an imagewise alteration of the optical density of the sheet material. In one aspect, a visible image may be formed by developing an exposed photosensitive element to form, as a function of development, an imagewise distribution of constituents which are capable of rendering a normally opaque sheet material light-transmittant, and transferring at least a portion of this imagewise distribution of constituents, by imbibition, to the sheet material while it is in superposed relationship with the photosensitive element, whereby to render the sheet material light-transmittant in areas corresponding to the imagewise distribution of transferred constituents.

In the preferred embodiment of the invention described and claimed in the aforementioned copending application, use is made of the selective exhaustion of alkali from an aqueous alkaline processing solution, as a function of development, and the transfer of unexhausted alkali to a normally reflective layer of a suitable metal in order to form the visible image. In other words, in the preferred embodiment an aqueous alkaline processing solution is spread between an exposed silver halide emulsion and a superposed sheet material comprising a relatively thin reflective layer of a suitable metal, alkali is exhausted in fully developed areas and the unexhausted alkali in the processing solution contacts the layer of metal where it alters the optical characteristics of the layer from light reflective to light transmittant to provide a negative transparency. The alteration of the optical properties from light reflective to light transmittant is at least in part an "etching" of the metal sheet material of the alkali.

It has now been found that if a light-polarizing material is employed as the sheet material in the process described in the aforementioned application of Edwin H. Land, a light polarizing image is formed which may be viewed in ordinary manner as a negative transparency or subsequently employed like other polarizing images, e.g., in the preparation of three-dimensional or stereoscopic images. The light-polarizing sheet material may be prepared in the manner described and claimed in copending application Ser. No. 187,679 filed Apr. 16, 1962 in the name of Eugene S. Emerson, now U.S. Patent No. 3,353,895.

As is taught in the latter copending application, the light-polarizing material is formed by the controlled directional deposition-in-vacuum of selected evaporable materials adapted to the purpose onto and along, in the direction of deposition, a proper carrying surface or substrate, the direction of the vapor stream from the evaporation source downwardly toward the surface being at a selected angle or angles. The vacuum deposition is performed, preferably employing a very high vacuum, in such a manner as to produce a multiplicity of microscopic laterally spaced filamentous areas or particles which may be compared to minute threads or fibers evaporated onto and distributed throughout the surface of a receiving or carrying layer in a predetermined substantially oriented arrangement according to the intended polarizing structure and function.

A preferred sheet material is a light-polarizing aluminum layer, the preparation of which is described in the aforementioned application of Eugene S. Emerson.

The following example shows by way of illustration and not by way of limitation the preparation of a light-polarizing sheet material useful in the practice of this invention.

Example 1

A sheet of cellulose acetate was mounted in a high vacuum enclosing tank. The sheet was adjusted so that an angle of 5 degrees or less was established between a line extending from a piece of aluminum mounted in a heater within the tank and the plane of the sheet at a location extending transversely as a line across the sheet at its center. A vacuum between $10^{-3}$ torr and $10^{-6}$ torr was produced in the tank. The aluminum was heated to its sublimation temperature, namely to approximately 660° C. It was permitted to evaporate and form a deposition on the cellulose acetate sheet for approximately 15 seconds. No special emission baffle or guide means was employed, so that vaporization was directed, in terms of its vertical dimension, in a somewhat flared or conically

3451815 shaped manner. This produced a light polarizer which in the area contiguous with the aforesaid center line had a proper density and an essentially neutral transmittance characteristic. The polarizer was removed and was found to have a density (dichroic) ratio of 15.

The following example shows by way of illustration and not by way of limitation the preparation of a polarizing image by the present invention.

Example 2

A conventional gelatino silver halide emulsion was photoexposed and then developed by spreading between the exposed emulsion and the polarizing aluminum sheet prepared in Example 1, in a layer approximately 0.0040 inch thick, a processing composition comprising:

| | | |
|---|---|---|
| Water | cm. | 8289.0 |
| Hydroxyethyl cellulose | gm. | 366.0 |
| Sodium hydroxide | gm. | 247.5 |
| 4,6-diamino-ortho cresol | gm. | 270.0 |
| 5-nitrobenzimidazole nitrate | gm. | 270.0 |

After an imbibition period of 2 minutes, the aluminum sheet was separated and was found to contain a relatively low contrast negative transparency. When a second sheet of polarizing material was placed between the source of viewing light with its axis of polarization crossed (i.e., at right angles) with the axis of polarization of the polarizing image, the shadow areas of the image appeared much darker, thereby providing an image of good density and contrast.

From the foregoing description and illustrative examples, it will be apparent that the present invention provides a simple and efficient one-step process for preparing a polarizing image. While processes for the destruction or removal of a polarizing material or the polarizing properties of a material by the action of chemicals have heretofore been known, these prior processes have utilized other systems and, as far as is known, it has never heretofore been suggested that polarizing images may be prepared by selective imagewise removal or of destruction of a polarizing material as a function of development of an exposed silver halide emulsion in the manner described above and defined in the appended claims. As illustrations of such prior art practices, mention may be made of U.S. Patents No. 2,203,687 and 2,329,543.

The polarizing images prepared by the present invention may be employed to provide stereoscopic or three-dimensional images in known manner, e.g., in the manner disclosed in the aforementioned patents. In other words, by the present invention it is possible to obtain a photographic image which when viewed by ordinary transmitted light may be of such low contrast as to be faint or even substantially invisible, yet when viewed through a polarizer or analyzer, the polarizing axis of which is crossed with that of the polarizing surface on which the image is formed, the shadow or grey areas of the image become appreciably darker and the resulting image then becomes vividly apparent to the viewer.

In known manner, stereoscopic images may also be formed by superimposing a pair of polarizing images with the polarizing axis of one at right angles to the polarizing axis of the other. Likewise, two such images, one a right-eye image, the other a left-eye image, may be projected upon a suitable viewing screen where the images are superimposed and viewed through polarizing analyzers. As is well known in the art, a pair of analyzers may be employed, one positioned adjacent the left eye of an observer and the other positioned adjacent the right eye of the observer with the axes of the two analyzers being positioned so that the observer will see with his left eye only the left-eye image and with his right eye only the right-eye image. A stereoscopic effect is thus obtained. Thus the polarizing images may be directly viewed by an observer equipped with a suitable analyzing device or they may be projected upon a suitable nondepolarizing screen and viewed by many observers equipped with suitable analyzers.

The various methods of viewing polarizing images and the uses to which such images may be subjected are well known in the art and certain of these viewing procedures and the uses thereof are described with more particularity in the aforementioned U.S. Patent No. 2,203,687.

Accordingly, the essence of the present invention is the provision of a novel polarizing image and a novel process for the preparation thereof. The uses to which such an image may be subjected are well known in the art and per se comprise no part of the present invention.

It will be understood that one may obtain positive light polarizing images in accordance with this invention by employing silver halide emulsions adapted to provide direct positive images, e.g., internal latent image emulsions.

Since certain changes may be made in the above product and process without departing from the scope of the invention herein involved, it is intended that all matter contained in the above description shall be interpreted as illustrative and not in a limiting sense.

What is claimed is:

1. A method for preparing light-polarizing images which comprises the steps of developing an exposed silver halide emulsion with an aqueous alkaline processing composition, exhausting alkali in said processing composition in exposed areas, while forming an imagewise distribution of unexhausted alkali in terms of unexposed areas of said emulsion, and transferring at least part of said imagewise distribution of unexhausted alkali, by imbibition, to a superposed sheet material comprising a transparent support having thereon a light-polarizing metal layer, said imagewise distribution of transferred alkali altering said light-polarizing material to provide a negative transparency.

2. A method for preparing light-polarizing images which comprises the steps of developing an exposed silver halide emulsion with an aqueous alkaline processing composition, exhausting alkali in said processing composition in exposed areas, while forming an imagewise distribution of unexhausted alkali in terms of unexposed areas of said emulsion, and transferring at least part of said imagewise distribution of unexhausted alkali, by imbibition, to a superposed sheet material comprising a transparent support having thereon a light-polarizing aluminum layer, said imagewise distribution of transferred alkali altering said light-polarizing aluminum layer to provide a negative transparency.

3. A method as defined in claim 2 wherein said light-polarizing aluminum layer is formed by controlled deposition-in-vacuum of aluminum upon a support.

References Cited

UNITED STATES PATENTS

| | | | |
|---|---|---|---|
| 2,329,543 | 9/1943 | Land | 96—27 XR |
| 2,397,276 | 3/1946 | Land | 350—153 |
| 3,307,946 | 3/1967 | Mahler | 96—40 |
| 3,353,895 | 11/1967 | Emerson | 350—155 |
| 2,346,775 | 4/1944 | Mahler | 101—149.1 |
| 2,647,055 | 7/1953 | Land | 96—29 |
| 2,997,390 | 8/1961 | Land | 96—29 |
| 3,186,842 | 6/1965 | De Haes et al. | 96—29 |
| 3,189,454 | 7/1965 | Luckey et al. | 96—29 X |
| 3,222,175 | 12/1965 | Rasch | 96—29 X |

J. TRAVIS BROWN, *Primary Examiner.*

C. BOWERS, *Assistant Examiner.*

U.S. Cl. X.R.

96—40; 350—153, 155.